R. N. MARTZ.
COMBINED STEERING AND DRIVE WHEEL FOR AUTOMOBILES.
APPLICATION FILED JUNE 23, 1916.
1,377,905.
Patented May 10, 1921.
2 SHEETS—SHEET 1.
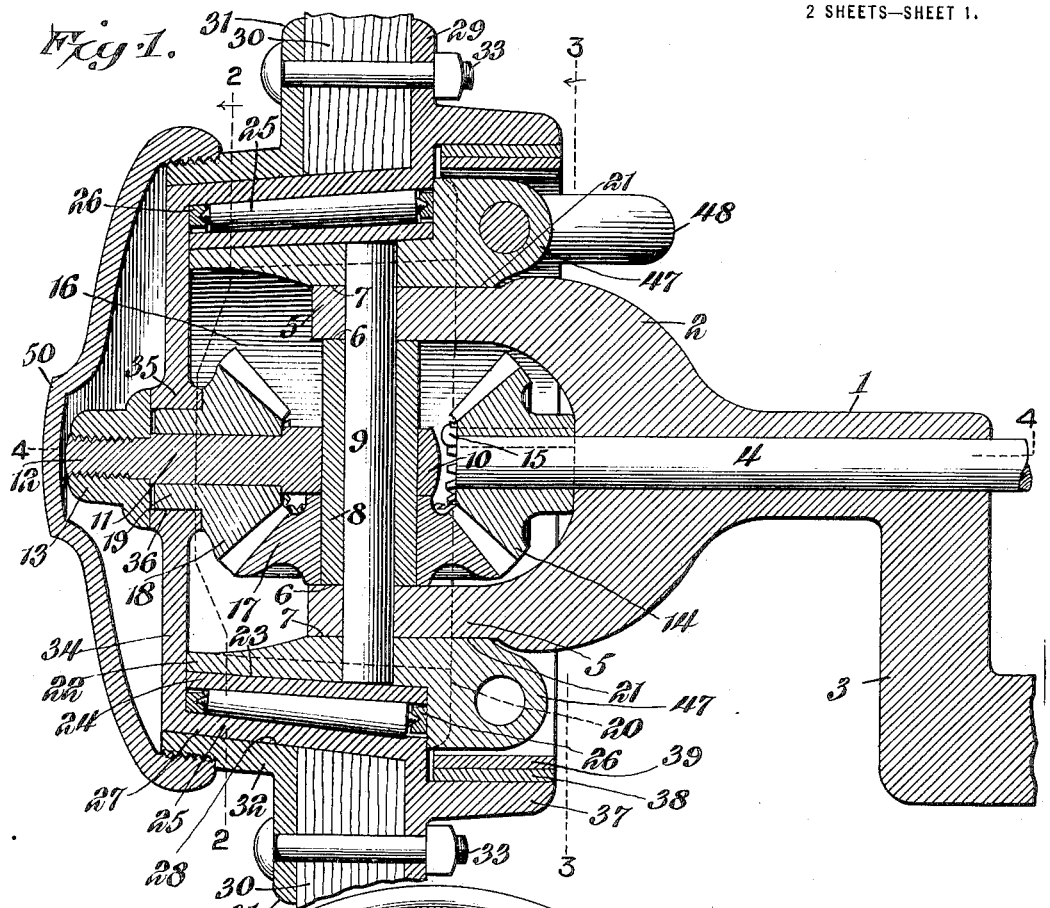
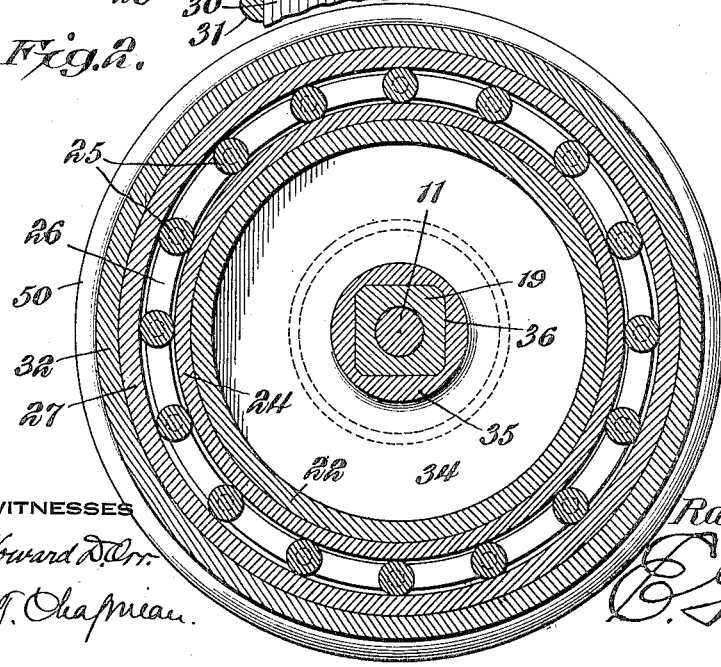
WITNESSES
Howard D. Orr
F. T. Chapman
INVENTOR,
Randolph N. Martz,
ATTORNEY

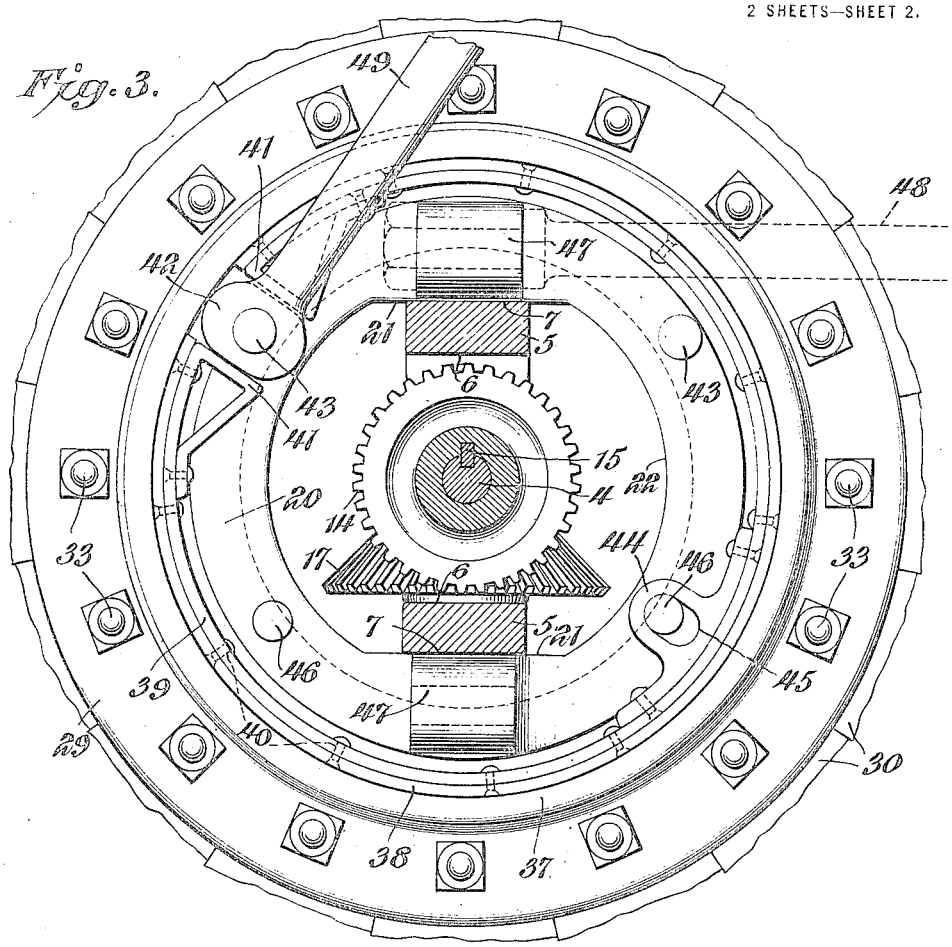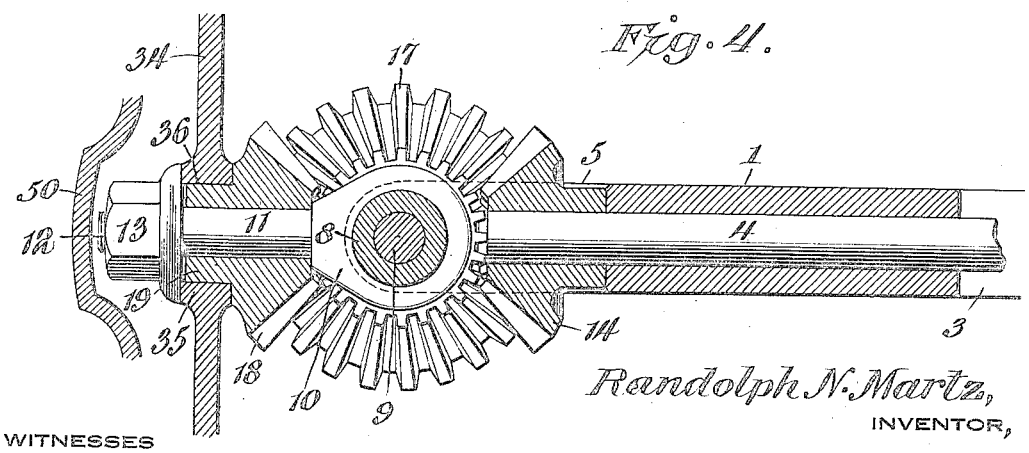

UNITED STATES PATENT OFFICE.

RANDOLPH N. MARTZ, OF FREDERICK, MARYLAND.

COMBINED STEERING AND DRIVE WHEEL FOR AUTOMOBILES.

1,377,905.   Specification of Letters Patent.   Patented May 10, 1921.

Application filed June 23, 1916. Serial No. 105,465.

*To all whom it may concern:*

Be it known that I, RANDOLPH N. MARTZ, a citizen of the United States, residing at Frederick, in the county of Frederick, and State of Maryland, have invented a new and useful Combined Steering and Drive Wheel for Automobiles, of which the following is a specification.

This invention has reference to combined steering and drive wheels for automobiles and its object is to provide a wheel for the purpose particularly adaptable for heavy service, and also particularly adaptable where road conditions are difficult.

The invention comprises a steering wheel hub with means for manipulating it and power driving means located within the hub and so constructed and arranged that the upright axis of turning of the wheel in steering is in line with the tread of the wheel, so that heavy strains are avoided and the steering is correspondingly lightened.

The hub of the wheel contains driving gearing arranged about the axis of steering of the wheel and interposed between the wheel hub and the drive shaft. The hub is capable of turning with respect to the vehicle axle carrying it on an upright axis and connections are provided whereby the usual steering mechanism may be attached to the wheel or in cases of heavy vehicles the parts may be duplicated, such arrangement for duplication also providing for rights and lefts, since the present invention is adaptable to all the wheels of a vehicle whereby draft is increased and skidding practically eliminated.

The invention also includes certain structural details which will hereinafter appear.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modification come within the scope of the appended claims.

In the drawings:—

Figure 1 is a diametric section of the improved wheel hub.

Fig. 2 is a section on the line 2—2 of Fig. 1.

Fig. 3 is a section on the line 3—3 of Fig. 1.

Fig. 4 is a section on the line 4—4 of Fig. 1 but omitting certain distant parts.

Referring to the drawings, there is shown a portion of an axle 1 of an automobile, this axle terminating at the outer end in a yoke 2. Although only one end of the axle is shown, it will be understood that a vehicle provided with the present invention both ends of each axle may be alike. The axle is provided with a drop portion 3, but as this forms no part of the present invention further reference thereto is not made. Extending through the axle is a shaft 4 to which power may be applied and which therefore constitutes a drive shaft. The yoke 2 terminates in legs 5 which in the installed position are arranged one above the other, the legs extending horizontally and provided top and bottom with flat faces 6, 7, respectively, which may be in parallel relation one to the other. Extending between the faces 6 is a sleeve 8 and located near the outer ends of the legs 5 and traversing these legs and the sleeve 8 is a king pin 9.

Surrounding the sleeve 8 is an eye 10 having a radial prolongation 11 in the form of an axle or stud, the free end of which is provided with a threaded portion 12 receiving a nut 13. The eye 10 is capable of turning on or with the sleeve 8 and is located midway between the legs 5 of the yoke 2 with the stud or extension 11 ordinarily in line with the shaft 4 and located at the same height as the shaft 4 with respect to the surface upon which the automobile is supported.

The shaft 4 extends into the yoke 2 for a short distance and there has a bevel pinion 14 secured to it to turn with it by means of a key 15.

Mounted on the sleeve 8 on one side of the eye 10 is a bevel pinion 17, capable of rotating idly about the sleeve 8 between the eye 10 and the surfaces 6 of the respective legs 5 of the yoke 2. Mounted on the stud 11 is another bevel pinion 18 meshing with the pinion 17, while the latter both mesh with the pinion 14. The pinion 18 at the end remote from the eye 10 terminates in a hub extension 19 shown as of square contour, but it will be understood that any other non-circular shape may answer, the square contour, however, being preferred.

Surrounding the leg ends of the yoke 2 is a ring 20 having its inner circumference formed with flat parallel chord portions 21 engaging the surfaces 7 of the legs 5. The ring 20 is traversed by the end portions of the king pin 9 and the flat surfaces 7 and 21 provide for a rocking of the ring 20 about a diametric axis coinciding with the longitudinal central axis of the king bolt. The ring 20 is broadened laterally, as indicated at 22, and the outer surface of the ring with its lateral extension 22 is inclined or beveled, as indicated at 23, the ring being of greater external diameter at the inner or vehicle end than at the outer end. The surface 23 receives a taper ring 24 providing a race-way for rollers 25 mounted at the ends in cage rings 26. These rollers may be taken as indicative of any type of roller or other anti-friction bearings used in automobiles, for the present invention is not limited in the use of anti-friction bearings to any particular type thereof.

Mounted on and surrounding the rollers 25 is a hub sleeve 27 having an internal taper similar to that of the roller bearings 25 and the hub sleeve 27 has its outer surface 28 similarly tapered. At the inner or vehicle end of the hub the sleeve 27 is provided with an outstanding or radial flange 29 to form an abutment for spokes 30, while another flange 31 formed on a taper ring 32 constitutes a holding member for the spokes, both flanges and the spokes being traversed by bolts 33, as is customary. The smaller or outer end of the hub ring 27 is provided with a face plate or radial web 34 thickened near the center, as shown at 35, and there traversed by a square opening 36 to receive the axially extended hub 19 of the pinion 18.

On the vehicle side of the flange 29 the latter has formed thereon a cylindrical overhang or brake drum 37 designed to be engaged by a brake shoe 38 carried by a brake band 39. The shoe 38 and band 39 are connected together by rivets 40 or in any other suitable manner and are circumferentially discontinuous to allow for expansion and contraction. The brake band at the terminal portions has abutments 41 which may be made by returning the end portions of the brake band upon themselves and properly securing them, and between these abutments there is lodged a cam 42 mounted to rock upon a pin 43 carried by and projecting from the ring 20. Two such pins 43 are provided, so that the cam 42 may be mounted upon either one of them to arrange for the use of the wheel on either side of the vehicle. The brake band 39 carries a sustaining and guiding eye 44 diametrically opposite to the cam 42 and the eye has an elongated slot 45 therein to permit expansion and contraction of the brake band. The eye 45 is traversed by a pin 46 projecting from the ring 20 and a similar pin 46 is spaced from the first pin 46 by an appropriate distance, so that the brake band may be properly supported whether the wheel be used on the right or the left hand side of the vehicle.

The ring 20 where provided with the inner chord portion 21 is formed with an ear 47 for the attachment of a steering rod 48, which latter may follow the usual practice. There are two ears 47 at diametrically opposite sides of the ring, so that in the case of heavy service, as in motor trucks and the like, or where there is a liability of heavy strains being put upon the device, two steering rods 48 may be employed.

The cam 42 is at one end of a manipulating rod 49, which, of course, is suitably prolonged and formed to provide for the application of the brakes as needed.

The nut 13 serves to hold the hub in place and with it the other parts of the mechanism carried by the axle 1. In order to protect and also provide a finish for the hub, a hub cap 50 is screwed upon the flange ring 32.

By encircling the legs 5 of the yoke with the ring 20 and interposing the sleeve 8 between the inner surfaces of the outer ends of the legs 5 in surrounding relation to the king pin 9, the yoke 2 is greatly strengthened besides providing a support for the differential gearing between the drive shaft 4 and the hub of the wheel with the tread of the wheel where engaging the ground on a diameter of the wheel coinciding substantially with the longitudinal axis of the king pin. Whenever, therefore, the wheel is turned, in steering, about the king pin as an axis, the point of engagement of the wheel with the ground is in about the same axis and but little force is required to move the wheel in steering and to maintain it in its adjusted position.

What is claimed is:—

1. A combined driving and steering wheel comprising an axle with a forked end, a drive shaft traversing the axle, intermeshing gearing carried by the axle in the fork with one of the gears fast to the shaft, a ring carried by the fork exterior thereto and provided with a lateral outwardly directed extension, a king bolt traversing the ring and the legs of the fork, an axle stud having one end concentric with the king bolt and carrying one of the gears, antifriction bearings surrounding the ring and carried thereby, a hub sleeve mounted on the antifriction bearings and fast to the last named gear, and manipulating means connected to the ring for turning it about the longitudinal axis of the king bolt.

2. A combined driving and steering wheel for vehicles provided with an axle, a drive shaft extending through the axle, a wheel carried by the axle, driving connections between the drive shaft and wheel, steering means for the wheel, and brake means for the wheel, both the steering means and the brake means being provided with a plurality of devices for the attachment of manipulating means thereto, whereby the manipulating means for the brake means may be changed from one to the other of the devices to accommodate the wheel to either the right or left hand side of the vehicle without further change and the manipulating means for the steering means may be multiplied for heavy service.

3. A combined driving and steering wheel for vehicles provided with steering means, a plurality of devices for attachment of manipulating means thereto, whereby the wheel may be adapted to heavy service, brake means, and a plurality of spaced attachment devices for brake manipulating means carried by the same structure provided for the attachment of the steering means, whereby the brake means may be properly supported whether the wheel be used on the right or the left hand side of the vehicle.

In testimony that I claim the foregoing as my own, I have hereto affixed my signature in the presence of two witnesses.

RANDOLPH N. MARTZ.

Witnesses:
A. LE ROY McCARDELL,
EDWARD D. SHRINER, Jr.